(12) United States Patent
Honda et al.

(10) Patent No.: US 11,276,155 B2
(45) Date of Patent: Mar. 15, 2022

(54) AUTOMATED INSPECTION SYSTEM AND AUTOMATED INSPECTION METHOD INCLUDING A DATA COLLECTION DEVICE THAT GENERATES EXPOSURE PARAMETER DETERMINATION INFORMATION

(71) Applicant: Hitachi, Ltd., Tokyo (JP)

(72) Inventors: Jumpei Honda, Tokyo (JP); Takuma Nishimura, Tokyo (JP); Hiroshige Kashiwabara, Tokyo (JP)

(73) Assignee: HITACHI, LTD., Tokyo (JP)

( * ) Notice: Subject to any disclaimer, the term of this patent is extended or adjusted under 35 U.S.C. 154(b) by 105 days.

(21) Appl. No.: 16/637,360

(22) PCT Filed: Jun. 6, 2018

(86) PCT No.: PCT/JP2018/021672
§ 371 (c)(1),
(2) Date: Feb. 7, 2020

(87) PCT Pub. No.: WO2019/053969
PCT Pub. Date: Mar. 21, 2019

(65) Prior Publication Data
US 2020/0357107 A1    Nov. 12, 2020

(30) Foreign Application Priority Data

Sep. 13, 2017   (JP) .............................. JP2017-175507

(51) Int. Cl.
G06T 7/00    (2017.01)
G08C 19/36   (2006.01)
H04Q 9/02    (2006.01)

(52) U.S. Cl.
CPC ............ *G06T 7/0002* (2013.01); *G08C 19/36* (2013.01); *H04Q 9/02* (2013.01)

(58) Field of Classification Search
None
See application file for complete search history.

(56) References Cited

U.S. PATENT DOCUMENTS 6,546,308 B2 *  4/2003  Takagi .................. G01N 21/94
                                                    348/126
7,095,884 B2 *  8/2006  Yamaguchi ...... G01N 21/95684
                                                    250/559.36
(Continued)

FOREIGN PATENT DOCUMENTS

JP   2002288780 A   10/2002
JP   2003067886 A    3/2003
(Continued)

OTHER PUBLICATIONS

International Search Report of PCT/JP2018/021672 dated Aug. 28, 2018.

*Primary Examiner* — Tahmina N Ansari
(74) *Attorney, Agent, or Firm* — Mattingly & Malur, PC

(57) ABSTRACT

There are provided an automatic inspection system and an automatic inspection method capable of suppressing power consumption of a measurement device. A measurement device includes a sensor unit 11 that measures an inspection target 3, a parameter management unit 13 that determines a predetermined parameter set for the sensor unit based on parameter determination information received from a data collection device 2, and a measurement data generation unit 12 that generates measurement data by analyzing data obtained by the sensor unit measuring the inspection target by using the predetermined parameter. The data collection device includes a parameter determination information generation unit 23 that generates parameter determination information, and a measurement data acquisition unit 21 that specifies the parameter determination information for the measurement device, requests the measurement device to (Continued)

acquire the measurement data, and stores the measurement data acquired from the measurement device.

7 Claims, 9 Drawing Sheets

(56) References Cited

U.S. PATENT DOCUMENTS

| | | | |
|---|---|---|---|
| 8,259,900 B1* | 9/2012 | Ledoux | G01V 5/0025 378/57 |
| 2004/0249590 A1 | 12/2004 | Ota et al. | |
| 2005/0027482 A1* | 2/2005 | Benaoudia | G01N 21/3554 702/183 |
| 2007/0194913 A1 | 8/2007 | Yokoshima et al. | |
| 2012/0224669 A1* | 9/2012 | Ledoux | G01V 5/0069 378/41 |
| 2018/0364589 A1* | 12/2018 | Chen | G03F 7/70625 |
| 2020/0357107 A1* | 11/2020 | Honda | G06T 7/0002 |
| 2020/0400857 A1* | 12/2020 | Newman | G01T 1/20 |

FOREIGN PATENT DOCUMENTS

| | | | |
|---|---|---|---|
| JP | 2003115093 A | 4/2003 |
| JP | 2005085193 A | 3/2005 |
| JP | 2005275590 A | 10/2005 |
| JP | 2011060067 A | 3/2011 |

* cited by examiner

AUTOMATED INSPECTION SYSTEM AND AUTOMATED INSPECTION METHOD INCLUDING A DATA COLLECTION DEVICE THAT GENERATES EXPOSURE PARAMETER DETERMINATION INFORMATION

TECHNICAL FIELD

The present invention relates to an automatic inspection system and an automatic inspection method.

BACKGROUND ART

Meters such as flow meters or power meters (for example, needle meters) installed in plants such as factories and substations are inspected by visual inspection by a user at a frequency of about several times to a dozen times a day. In an automatic inspection system, the meter to be inspected is captured by a camera at a site, and the captured image is transmitted to a center. Accordingly, a user in a management room can remotely confirm a meter value.

A measurement device used in such an automatic inspection system is often installed in a location where power supply from the outside is difficult. Meanwhile, the measurement device needs to continue to transmit the measurement data at a predetermined frequency for a long period of time. Therefore, the automatic inspection system needs to be operated for a long period of time with an independent power supply such as a battery by suppressing power consumption of the measurement device as much as possible.

Incidentally, when a state of an inspection target (for example, a needle meter) is detected by an optical sensor such as a camera, it is necessary to adjust optical conditions such as a focus and an exposure in order to accurately analyze the read image. However, the measurement devices are installed outdoors in many cases, and are strongly affected by disturbances such as sunlight. The measurement device installed indoors is also affected by an operation state of a lighting device.

Since an environment in which the measurement device is located is not stable in this manner, it is difficult to adjust the focus and exposure by using fixed values. Since the exposure adjustment has a longer processing time than a capturing time by the camera, when the exposure adjustment is repeatedly performed, the power consumption of the measurement device is increased. Therefore, it is necessary to reduce the power consumption by shortening a time required for the exposure adjustment.

Here, PTL 1 discloses a technology for improving reliability by using an image database. PTL 2 discloses a technology for capturing a bright image without using a lighting device having high luminance.

CITATION LIST

Patent Literature

PTL 1: JP 2005-275590A
PTL 2: JP 2002-288780A

SUMMARY OF INVENTION

Technical Problem

PTL 1 and PTL 2 are technologies for efficiently recognizing meter-reading data, and are not technologies for shortening a measurement time of the measurement device or achieving power saving.

An object of the present invention is to provide an automatic inspection system and an automatic inspection method capable of suppressing power consumption of a measurement device. A further object of the present invention is to provide an automatic inspection system and an automatic inspection method capable of suppressing power consumption of a measurement device by shortening a time required to determine a predetermined parameter used for measurement.

Solution to Problem

In order to solve the aforementioned problems, an automatic inspection system according to the present invention is an automatic inspection system that includes a measurement device which outputs measurement data, and a data collection device which collects the measurement data from the measurement device. The measurement device includes a sensor unit that measures an inspection target, a parameter management unit that manages a predetermined parameter used when the sensor unit measures the inspection target, and determines the predetermined parameter set for the sensor unit based on parameter determination information received from the data collection device, and a measurement data generation unit that generates the measurement data by analyzing data obtained by measuring the inspection target by using the predetermined parameter by the sensor unit. The data collection device includes a parameter determination information generation unit that generates the parameter determination information, and a measurement data acquisition unit that specifies the parameter determination information for the measurement device, requests the measurement device to acquire the measurement data, and stores the measurement data acquired from the measurement device.

Advantageous Effects of Invention

According to the present invention, the measurement device can acquire the measurement data by determining the predetermined parameter based on the parameter determination information from the data collection device and setting the predetermined parameter for the sensor unit.

DESCRIPTION OF EMBODIMENTS

Figure 1:
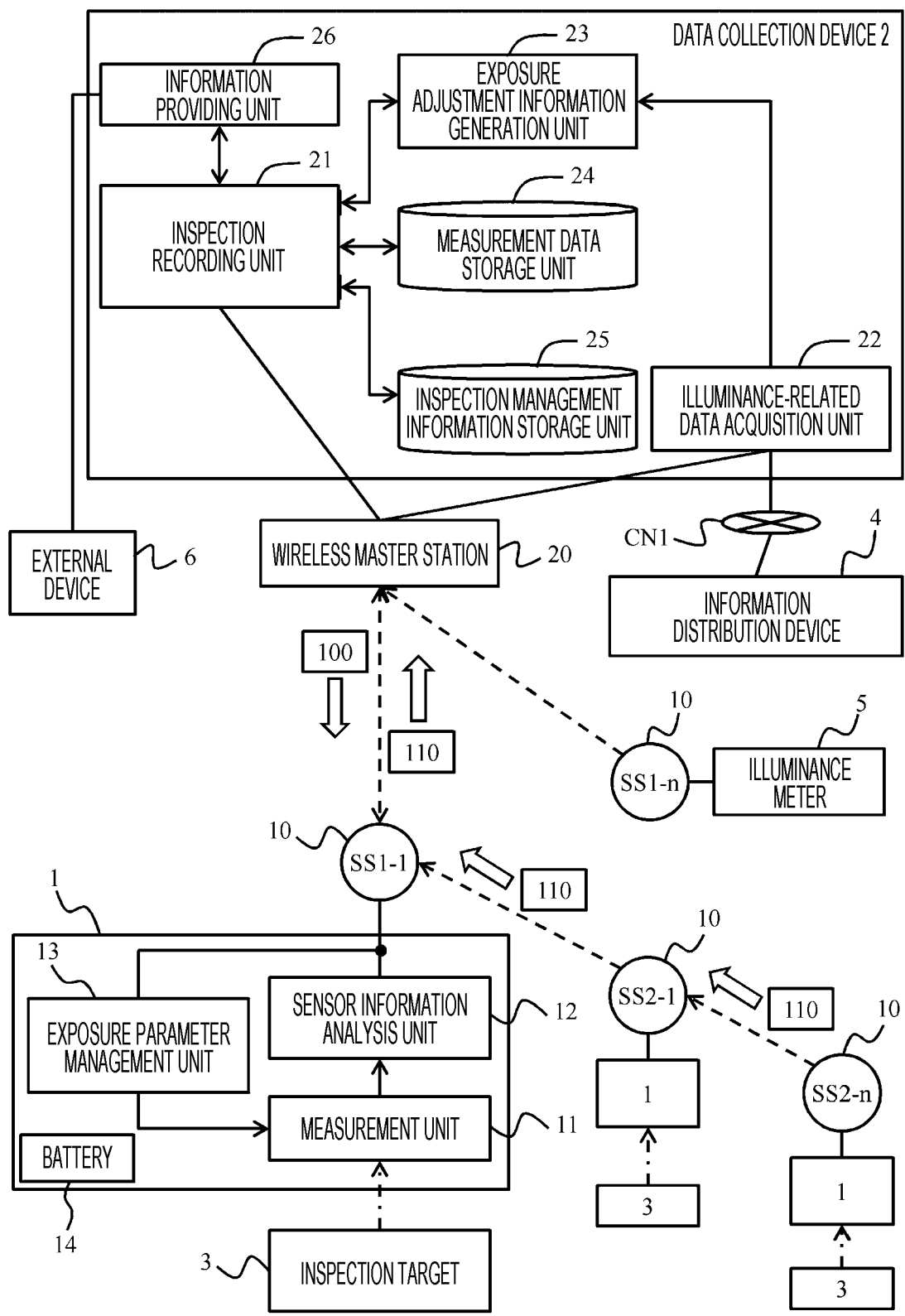
FIG. 1 is an overall view of an automatic inspection system.

Hereinafter, embodiments of the present invention will be described with reference to the drawings. For example, an automatic inspection system according to the present embodiment can be applied to various facilities such as a substation and a factory. In the present embodiment, it will be described that a needle meter is used as an inspection target, an image sensor such as a camera is used as a sensor unit, and an exposure parameter is used as a predetermined parameter. The image sensor is not limited to the camera, and any optical sensor having parameters that need to be adjusted at the time of measurement can be applied.

In the present embodiment, an exposure parameter which is a target value for exposure adjustment of a measurement unit 11 is retained in a reading device (measurement device) 1. A data collection device 2 determines exposure adjustment information for selecting the target value for exposure adjustment according to a surrounding environment of the measurement unit 11, and notifies the reading device 1 of the exposure adjustment information. Accordingly, since the reading device 1 can select the exposure parameter based on the exposure adjustment information, it is possible to shorten a time required for determining the exposure parameter compared to a case where exposure adjustment is performed without knowing the surrounding environment. As a result, in the present embodiment, since an exposure adjustment time in the reading device 1 can be shortened, power consumption of the reading device 1 can be reduced. Therefore, a battery lifespan of the reading device 1 can be extended, and usability is improved.

The automatic inspection system according to the present embodiment uses a wireless network including wireless slave stations 10 and a wireless master station 20, as will be described below. Each wireless slave station 10 is connected to an inspection target reading device (hereinafter, also referred to as the reading device) 1. The wireless master station 20 and each wireless slave station 10 share time.

The reading device 1 acquires a physical quantity of an inspection target 3 by the measurement unit 11, reads a meter value by analyzing measured data (for example, image data) by an analysis unit 12, and manages the parameters when the exposure adjustment succeeds by an exposure parameter management unit 13. The reading device 1 is normally in a standby state. When the wireless slave station 10 receives a request from the wireless master station 20, the reading device 1 is activated by the wireless slave station 10.

The wireless master station 20 is connected to the data collection device 2. The data collection device 2 generates the exposure adjustment information based on illuminance-related data. The data collection device 2 specifies the exposure adjustment information, and requests each reading device 1 to acquire measurement data. The exposure adjustment information includes information (illuminance such as weather) related to the surrounding environment of the reading device 1. The acquisition request of the measurement data is transmitted from the wireless master station 20 to each wireless slave station 10 via the wireless network.

When the reading device is activated by the wireless slave station 10, the reading device 1 selects the exposure parameter based on the exposure adjustment information. When the exposure parameter corresponding to the exposure adjustment information is not stored, the reading device 1 selects an initial value of the exposure parameter. The reading device 1 sets the selected exposure parameter for the measurement unit 11, and acquires the physical quantity (image data) of the inspection target 3. The reading device 1 analyzes the acquired image data, and transmits, as the measurement data, the analysis result to the data collection device 2 via the wireless network.

When the measurement using the exposure parameter determined according to the exposure adjustment information fails, the reading device 1 adjusts a value of the exposure parameter, and causes the measurement unit 11 to perform re-measurement. When the measurement succeeds as a result obtained by performing re-measurement once or multiple times, the reading device 1 stores the exposure parameters when the measurement succeeds in association with the exposure adjustment information. Therefore, as the operation of the automatic inspection system is continued, the exposure parameters corresponding to the exposure adjustment information are accumulated in the reading device 1, and thus, it is possible to shorten an appropriate exposure parameter setting time at the time of generating the measurement data. Since the reading device 1 can set the appropriate exposure parameter in a short time by suppressing an exposure adjustment time, it is possible to reduce the power consumption.

The wireless master station 20 receives the measurement data of the physical quantity acquired by each reading device 1 from each wireless slave station 10 by a so-called bucket relay method. The data collection device 2 collects and stores the measurement data of each reading device 1 via the wireless master station 20.

The data collection device 2 can acquire the exposure parameter corresponding to each exposure adjustment information stored in each reading device 1. The data collection device 2 can provide information such as the exposure parameter, the exposure adjustment information, and a measurement timing to an external device 6 via an information providing unit 26.

A user such as a system administrator can cause the reading device 1 scheduled to be provided in a new facility to register the appropriate exposure parameter for each exposure adjustment information in advance based on the information provided by the information providing unit 26. Accordingly, the automatic inspection system of the new facility can obtain the appropriate exposure parameter for a less operation time.

First Embodiment

A first embodiment will be described with reference to FIGS. 1 to 6. In the present embodiment, an example in which an inspection target in a substation is automatically inspected will be described. Examples of the inspection target can include a color of a desiccant in addition to various instruments such as ammeters, voltmeters, pressure gauges, flow meters, level meters, thermometers, hygrometers, solar meters, and anemometers.

The automatic inspection system includes, for example, a plurality of reading devices 1 and at least one data collection device 2. The reading device 1 as the "measurement device" is connected to an adjacent node (reading device 1 or data collection device 2) through wireless communication via, for example, a so-called multi-hop wireless network.

The reading device 1 is, for example, an electronic circuit device that includes hardware resources such as a microprocessor, a memory, an input and output unit, and a battery (all not illustrated). The reading device 1 includes, as a function of using these hardware resources, the measurement unit 11 as a "sensor unit", the sensor information analysis unit 12 as a "measurement data generation unit", and an exposure parameter management unit 13 as a "parameter management unit". A power is supplied from a built-in battery 14 to these units 11, 12, and 13 as necessary.

The reading device 1 further includes the wireless slave station 10. The wireless slave station 10 may be provided separately from the reading device 1 and electrically connected to the reading device 1, or may be provided inside the reading device 1.

The wireless slave station 10 is connected to another wireless slave station 10 or the data collection device 2 via the multi-hop wireless network, and transfers packets by a so-called bucket relay system. A data size of the packet is as small as several kilobytes. Since the data collection device 2 needs to periodically collect data from the plurality (usually a large number) of wireless slave stations 10, a packet size is preferably as small as possible.

When a data transmission request (measurement data acquisition request) 100 from the data collection device 2 is received, the wireless slave station 10 activates the reading device 1 from a sleep state, and reads a meter value by the measurement unit 11. The measurement data acquisition request 100 includes the exposure adjustment information used for selecting the exposure parameter.

The exposure parameter management unit 13 of the reading device 1 sets the exposure parameter corresponding to the exposure adjustment information for the measurement unit 11, and causes the measurement unit 11 to capture an image of the inspection target 3. The sensor information analysis unit 12 of the reading device 1 reads a state (meter value) of the inspection target 3 by analyzing the image data read by the measurement unit 11.

The wireless slave station 10 transmits measurement data 110 including the meter value analyzed by the reading device 1 to the data collection device 2. Thereafter, the wireless slave station 10 causes the reading device 1 to transition to the sleep state again.

The measurement unit 11 captures the inspection target 3 such as a meter by using an image sensor such as a camera, reads the meter value, and outputs image data.

When the data is received from the measurement unit 11, the sensor information analysis unit 12 generates the measurement data 110 by analyzing the data. For example, the sensor information analysis unit 12 recognizes the meter value as a numerical value by performing character recognition on image data captured by the camera, and outputs numerical data as the measurement data 110.

As will be described below with reference to FIG. 3, the exposure parameter management unit 13 manages the exposure parameters corresponding to the exposure adjustment information. The exposure parameter management unit 13 can manage, for example, one exposure parameter for each exposure adjustment information and for each time zone. The exposure adjustment information may be information indicating a weather condition such as sunny, cloudy, or rainy, or may be information indicating illuminance. The time zone need not be in units of one hour, but may be in units of several hours.

As described above, the data collection device 2 periodically or aperiodically collects and manages the measurement data from each reading device 1 connected via the multi-hop wireless network. Thus, the data collection device 2 includes the wireless master station 20.

The data collection device 2 is, for example, a computer or a dedicated electronic circuit device that includes hardware resources such as a microprocessor, a memory, an auxiliary storage device, and an input and output unit (all not illustrated) and software resources such as an operating system and a computer program.

For example, the data collection device 2 realizes functions such as an inspection recording unit 21, an illuminance-related data acquisition unit 22, an exposure adjustment information generation unit 23, a measurement data storage unit 24, an inspection management information storage unit 25, and the information providing unit 26 by using the hardware resources and the software resources.

The functions 21 to 26 need not be present in the same computer system, and may be distributed to a plurality of computer systems. For example, processing units such as the inspection recording unit 21 and the exposure adjustment information generation unit 23 may be provided in the computer system, a storage unit such as the measurement data storage unit 24 may be provided in the storage system, and a computer system and a storage system may be connected so as to communicate with each other. The aforementioned configuration is an example, and which of the functions is distributed to which of the computer systems (including the storage system) is not particularly limited.

The inspection recording unit 21 as a "measurement data generation unit" realizes a data acquisition function and a data storage function. The inspection recording unit 21 periodically or aperiodically acquires the measurement data 110 from all or a part of the reading devices 1 via the multi-hop wireless network under the control of the data collection device 2.

When the measurement data 110 is collected, the inspection recording unit 21 generates the measurement data acquisition request 100 including the exposure adjustment information generated by the exposure adjustment information generation unit 23. The inspection recording unit 21 transmits the measurement data acquisition request 100 from the wireless master station 20 to each wireless slave station 10 via the wireless network.

The inspection recording unit 21 stores the measurement data (meter value) 110 collected from each reading device 1 in the measurement data storage unit 24. The inspection recording unit 21 records only the normally read measurement data of the measurement data 110 in the measurement data storage unit 24. Accordingly, it is possible to prevent useless data from being stored, and thus, it is possible to effectively use a storage resource of the measurement data storage unit 24.

The illuminance-related data acquisition unit 22 automatically acquires the data (illuminance-related data) used for generating the exposure adjustment information from an information distribution device 4 provided outside the automatic inspection system or an illuminance meter 5 incorporated in a wireless network. Alternatively, the system administrator may manually input the illuminance-related data to the illuminance-related data acquisition unit 22.

The information distribution device 4 is, for example, a server that distributes weather information. The illuminance-related data acquisition unit 22 is connected to the information distribution device 4 via a communication network CN1, and acquires, as the illuminance-related data, information related to the weather condition from the information distribution device 4. This is because an optical measurement environment of each reading device 1 disposed in a facility such as a substation is changed depending on the weather condition.

The illuminance meter 5 is incorporated in the multi-hop wireless network together with each reading device 1 of the automatic inspection system. The illuminance meter 5 measures illuminance at this location, and transmits the measurement result to the wireless master station 20 through the wireless slave station 10. The illuminance-related data acquisition unit 22 receives, as the illuminance-related data, the illuminance measured by the illuminance meter 5 from the wireless master station 20.

The weather condition related to the measurement environment of the reading device 1 may be acquired from the information distribution device 4 such as a weather information distribution server, illuminance at a site may also be acquired from the illuminance meter 5 at the site, and the exposure adjustment information may be generated based on information from the information distribution device 4 and the illuminance meter 5. For example, when the exposure adjustment information is generated based on the weather condition of an area where the automatic inspection system is installed but the illuminance from the illuminance meter 5 at the site is different from the illuminance estimated from the weather condition by a predetermined value or more, the illuminance of the illuminance meter 5 may be adopted.

The exposure adjustment information generation unit 23 corresponds to a "parameter determination information generation unit". The exposure adjustment information generation unit 23 generates the exposure adjustment information as "parameter determination information" based on the illuminance-related data input from the illuminance-related data acquisition unit 22. The exposure adjustment information is information used when the reading device 1 determines the exposure parameter to be set for the measurement unit 11.

The measurement data storage unit 24 is a function of storing the measurement data 110 collected from each reading device 1 via the multi-hop wireless network.

The inspection management information storage unit 25 is a function of storing management information necessary for automatic inspection. The acquisition of the inspection management information includes, for example, an installation location of each reading device 1, a device type, device identification information, and a type of the inspection target.

The information providing unit 26 is a function of providing the exposure parameters collected from each reading device 1 to the external device 6. Examples of information to be provided will be described in another embodiment to be described below.

The external device 6 is, for example, a computer terminal, and uses the information provided by the information providing unit 26 of the data collection device 2. For example, the user such as the system administrator determines the exposure parameter to be initially set for the reading device 1 provided in another facility based on the exposure parameter in each reading device 1 provided from the information providing unit 26.

The user such as the system administrator can exchange information with the data collection device 2 via the information providing unit 26. That is, the information providing unit 26 also functions as a user interface device, and the user can confirm information such as measurement data, an exposure parameter, and a measurement time or can set a value by using the external device 6 and the information providing unit 26. Examples of the external device 6 include a desktop personal computer, a laptop personal computer, a tablet personal computer, a mobile phone (including a so-called smartphone), and a portable information terminal.

Figure 2:
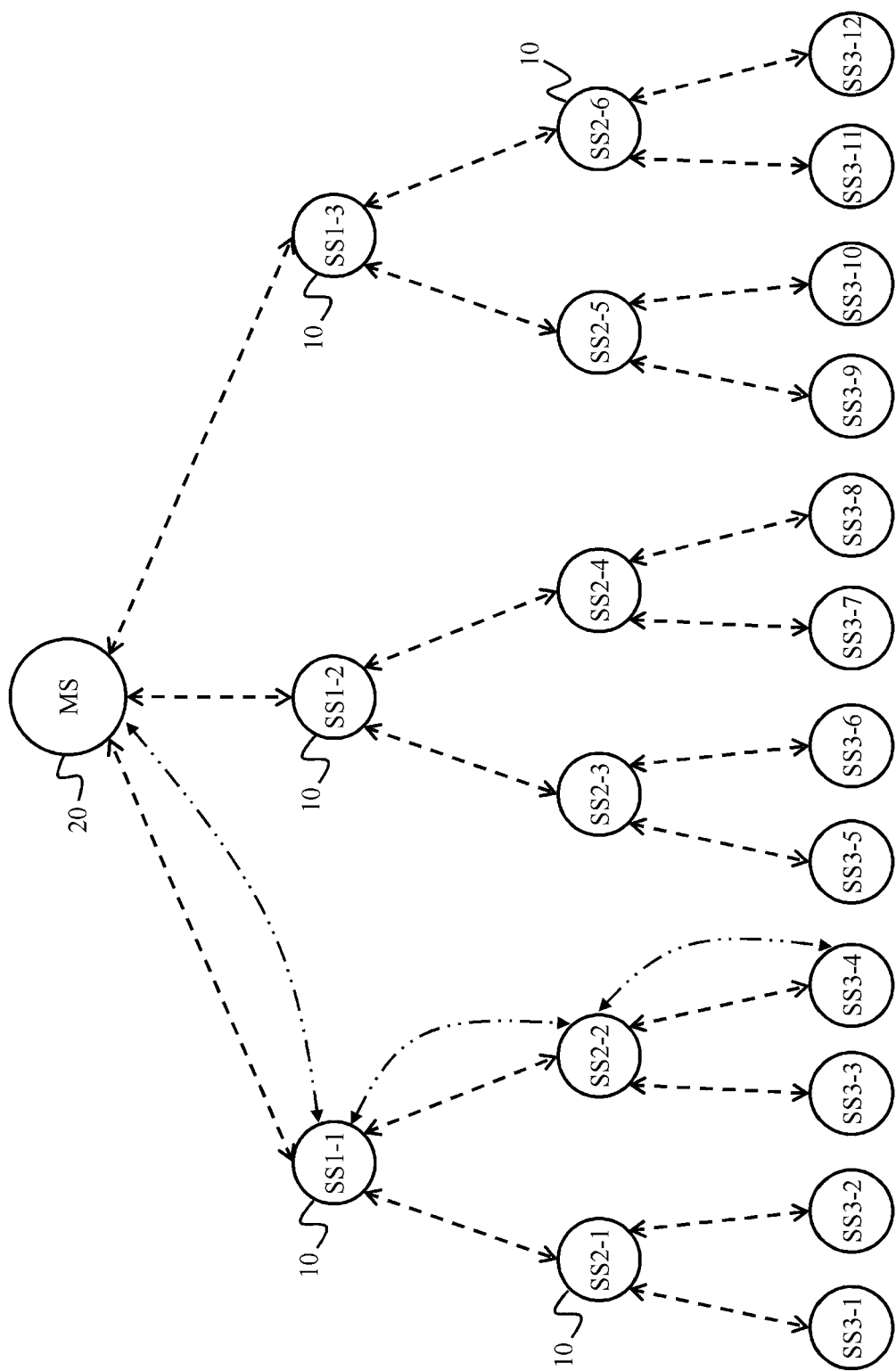
FIG. 2 is an explanatory diagram of a multi-hop wireless network.

FIG. 2 illustrates an overview of the multi-hop wireless network. In this drawing, the wireless master station is displayed as "MS", and the wireless slave station is displayed as "SS". A symbol corresponding to a layer of a communication distance is assigned to the wireless slave station 10. For example, "SS1-1" indicates a first wireless slave station among the wireless slave stations belonging to a layer of which the number of hops is one. The first and second wireless slave stations are administrative orders. Similarly, "SS2-3" indicates a third wireless slave station among the wireless slave stations belonging to a layer of which the number of hops is two.

When the wireless master station 20 communicates with the wireless slave station 10 as the layer of the terminal, the wireless slave station located in the middle functions as a relay station. For example, as represented by a two-dot chain line arrow in FIG. 2, when the wireless master station 20 communicates with the wireless slave station "SS3-4", the wireless slave stations "SS1-1" and "SS2-2" in the middle of the multi-hop wireless network are relay stations. Accordingly, when the wireless master station communicates with the wireless slave station as the terminal, not only the wireless slave station as a communication partner but also the wireless slave stations located in the middle are activated, and power is consumed.

When the measurement data is acquired from the reading device 1 (SS1), the data collection device 2 requests the reading device 1 (SS1) to transmit the measurement data acquisition request. This request includes the exposure adjustment information used to determine the exposure parameter in the reading device 1 (SS1). When the wireless slave station 10 (SS1) of the reading device 1 (SS1) receives the measurement data acquisition request from the data collection device 2, the reading device 1 (SS1) is activated.

When the reading device 1 (SS1) is activated, the reading device selects the exposure parameter based on the exposure adjustment information, and sets the selected exposure parameter for the camera as the measurement unit 11. When the reading device 1 (SS1) is activated, the meter value is read by capturing the inspection target 3 by the camera. The reading device 1 (SS1) determines whether or not the meter value is normally read, generates the measurement data 110, and transmits the measurement data 110 to the data collection device 2.

The wireless slave station 10 (SS1) of the reading device 1 (SS1) transmits the measurement data 110 to the data collection device 2, and then transitions the reading device 1 (SS1) to the sleep state.

Similarly, when the measurement data 110 is acquired from the reading device 1 (SS2), the data collection device 2 transmits the measurement data acquisition request including the exposure adjustment information to the reading device 1 (SS2). This measurement data acquisition request reaches the wireless slave station 10 (SS2) via the wireless slave station 10 (SS1) as the relay station.

When the measurement data acquisition request is received, the wireless slave station 10 (SS2) activates the reading device 1 (SS2). The reading device 1 (SS2) determines the exposure parameter based on the exposure adjustment information, and sets the determined exposure parameter for the camera. The reading device 1 (SS2) reads the meter value of the inspection target 3, generates the measurement data 110, and transmits the generated measurement data from the wireless slave station 10 (SS2) to the data collection device 2. The measurement data 110 of the reading device 1 (SS2) is sent to the data collection device 2 via the wireless slave station 10 (SS1) as the relay station.

The data collection device 2 stores the measurement data 110 collected as a response from each reading device 1 in the measurement data storage unit 24 via the inspection recording unit 21. The data collection device 2 determines whether or not each measurement data is within a preset normal range. When the measurement data is out of the predetermined normal range, the data collection device 2 notifies the user of an abnormality. For example, the data collection device 2 can notify the occurrence of the abnormality by transmitting an e-mail to the external device 6 owned by the user.

Figure 3:
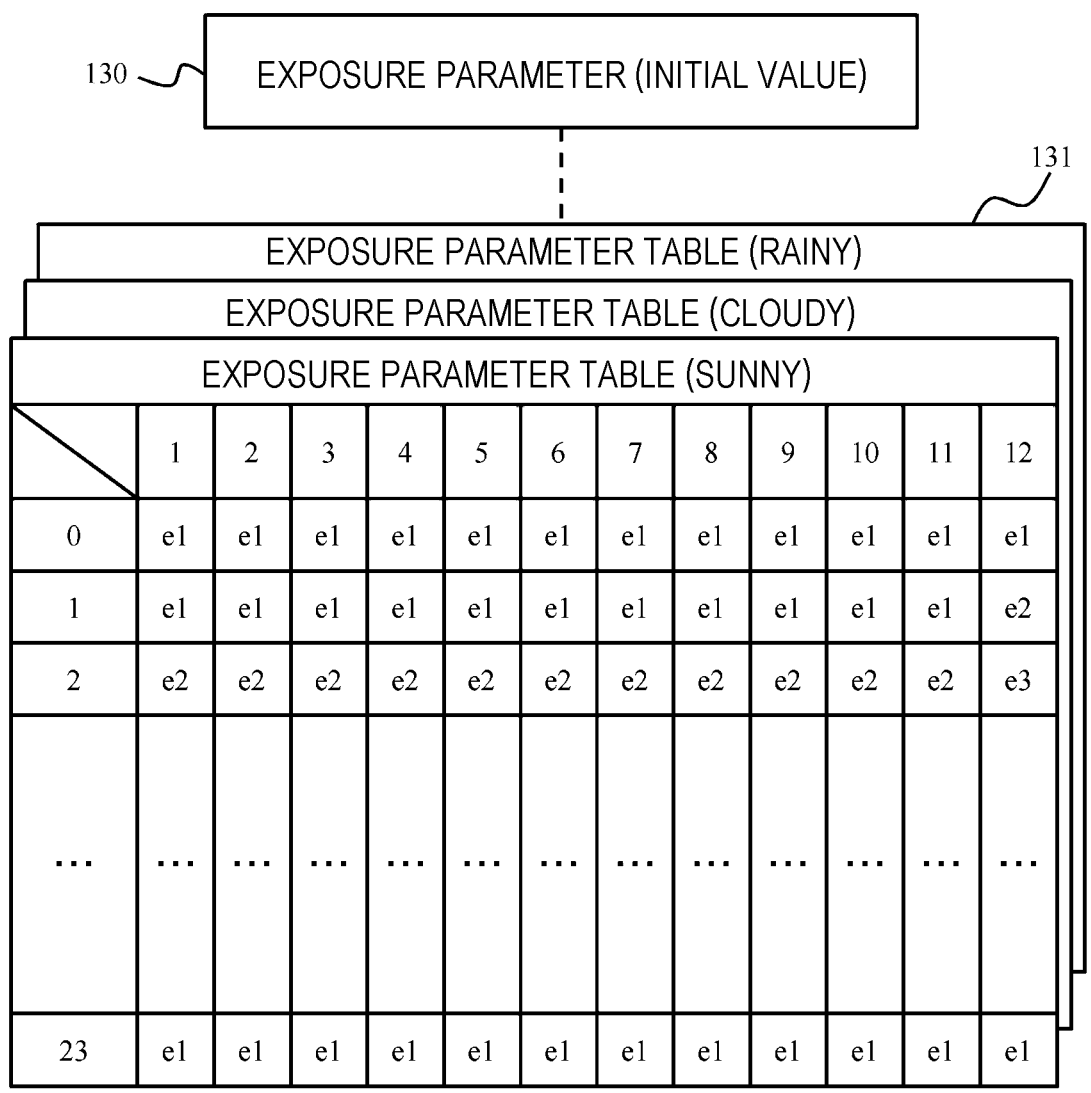
FIG. 3 is an explanatory diagram of a table managed by an exposure parameter management unit.

FIG. 3 illustrates the stored contents of the exposure parameter management unit 13 of the reading device 1. In the automatic inspection system of the present embodiment, the data collection device 2 generates the exposure adjustment information and transmits the generated exposure adjustment information to each reading device 1, and thus, a time required for adjusting the exposure parameter in each reading device 1 is shortened, and the power consumption is suppressed.

Although it has been described in the present embodiment that the exposure parameter management unit 13 is provided in the reading device 1, the exposure parameter management unit 13 may be present outside the reading device 1. For example, one exposure parameter management unit 13 may manage the exposure parameters of the plurality of reading devices 1.

The exposure parameter management unit 13 retains an initial value 130 of the exposure parameter and an exposure parameter table 131 corresponding to the exposure adjustment information.

The initial value 130 of the exposure parameter is also prepared so as to correspond to the exposure adjustment information. That is, the initial value can be prepared according to the weather condition (an index of a degree of brightness of the measurement environment).

For example, the exposure parameter table 131 manages the exposure parameters by using a month and a time zone, as management elements for each weather condition. The management elements are not limited to the months and time zones. For example, a season such as "spring, summer, autumn and winter" may be used, or a distinction such as "morning, daytime, and night" may be used.

When the exposure adjustment information (sunny, cloudy, and rain) is received, the exposure parameter management unit 13 selects the exposure parameter from the exposure parameter table 131 based on the exposure adjustment information and the current timing. When the exposure parameter is not set in the exposure parameter table 131 as in a case where the automatic inspection system is started up, the exposure parameter management unit 13 uses the initial value 130.

The exposure parameter management unit 13 overwrites and stores the exposure parameters when the capturing of the inspection target 3 succeeds (when the discrimination of the meter value succeeds) in the table 131. When the capturing succeeds by using the exposure parameter read out from the table 131, the value is retained. When the capturing using the exposure parameter read out from the table 131 fails, the exposure parameter is automatically adjusted by a predetermined amount. When the capturing using the adjusted exposure parameter succeeds, the succeeded exposure parameter (adjusted exposure parameter) is overwritten and stored in the table 131. Accordingly, as the operation of the automatic inspection system is continued, the exposure parameter management unit 13 can retain the appropriate exposure parameter corresponding to the exposure adjustment information for each reading device 1, and can reduce the time required for the exposure adjustment of the reading device 1 and the power consumption.

Figure 4:
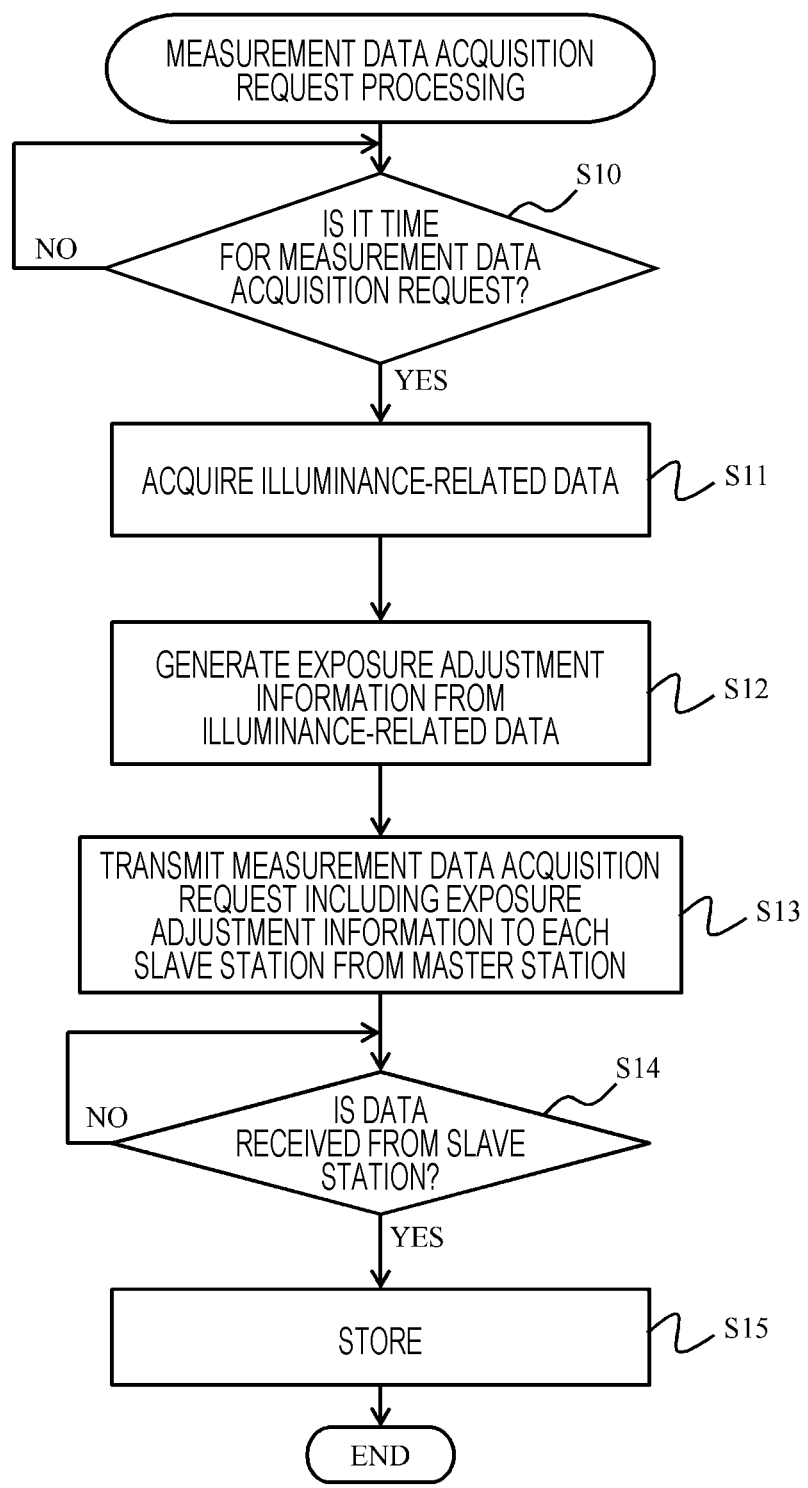
FIG. 4 is a flowchart illustrating processing for requesting each reading device to measure data by a data collection device.

FIG. 4 is a flowchart illustrating measurement data acquisition request processing. The present processing is performed by the data collection device 2. The inspection recording unit 21 of the data collection device 2 determines whether it is time to acquire the measurement data from each reading device 1 (S10).

When it is determined that it is time to acquire the measurement data (S10: YES), the illuminance-related data acquisition unit 22 of the data collection device 2 acquires the illuminance-related data from the information distribution device 4 or the illuminance meter 5 (S11). The exposure adjustment information generation unit 23 of the data collection device 2 generates the exposure adjustment information based on the illuminance-related data (S12).

The inspection recording unit 21 generates the measurement data acquisition request, and transmits the measurement data acquisition request from the wireless master station 20 to each wireless slave station 10 (S13). This measurement data acquisition request includes the exposure adjustment information.

Figure 5:
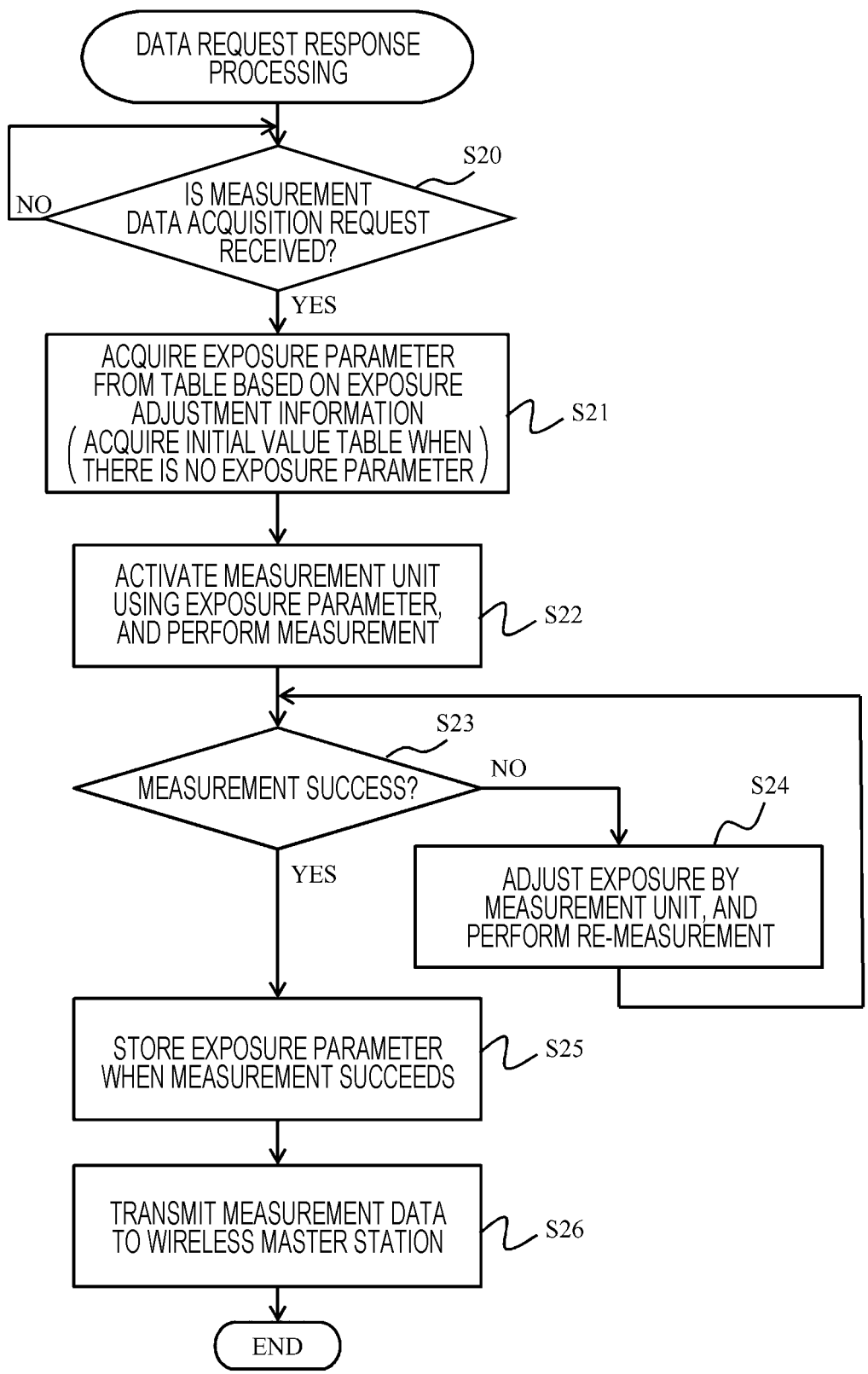
FIG. 5 is a flowchart illustrating processing for transmitting the measurement data by the reading device according to the request from the data collection device.

As described in FIG. 5, when the measurement data acquisition request is received, each wireless slave station 10 activates the reading device 1. The reading device 1 captures the inspection target 3 by using the exposure parameters based on the exposure adjustment information, and transmits the measurement data which is the analysis result to the data collection device 2.

When the inspection recording unit 21 of the data collection device 2 knows that the measurement data from each reading device 1 is received via the wireless network, the inspection recording unit stores the measurement data in the measurement data storage unit 24 (S15).

FIG. 5 illustrates a flowchart of a data request response processing which is a response to the measurement data acquisition request. This processing is performed by the reading device 1.

The reading device 1 is activated from the sleep state by the wireless slave station 10 that receives the measurement data acquisition request (S20: YES).

The exposure parameter management unit 13 acquires the exposure parameter from the exposure parameter table 131 based on the exposure adjustment information included in the measurement data acquisition request (S21). When the exposure parameter is not registered in the exposure parameter table 131, the exposure parameter management unit 13 selects the initial value 130 (S21).

The exposure parameter management unit 13 sets the exposure parameter selected in step S21 for the measurement unit 11, activates the measurement unit, and measures the inspection target 3 (S22). That is, the exposure parameter is set for the measurement unit 11 at the time of activation. In the present embodiment, since the exposure parameter is set at the time of activation, the measurement unit 11 does not need to perform the exposure adjustment, and can immediately measure the inspection target.

Raw data (image data) measured by the measurement unit 11 is analyzed by the sensor information analysis unit 12, and the meter value is read. When the sensor information analysis unit 12 cannot read the meter value (S23: NO), the measurement unit 11 adjusts the exposure parameter by a predetermined amount, and performs the re-measurement (S24). Steps S23 and S24 are repeated until the reading of the meter value succeeds.

When the sensor information analysis unit 12 succeeds in normally reading the meter value (S23: YES), the exposure parameter management unit 13 stores the exposure parameter when the measurement succeeds in the exposure parameter table 131 (S25). The sensor information analysis unit 12 transmits the measurement data (including the read meter value and the measurement timing) from the wireless slave station 10 to the wireless master station 20.

Figure 6:
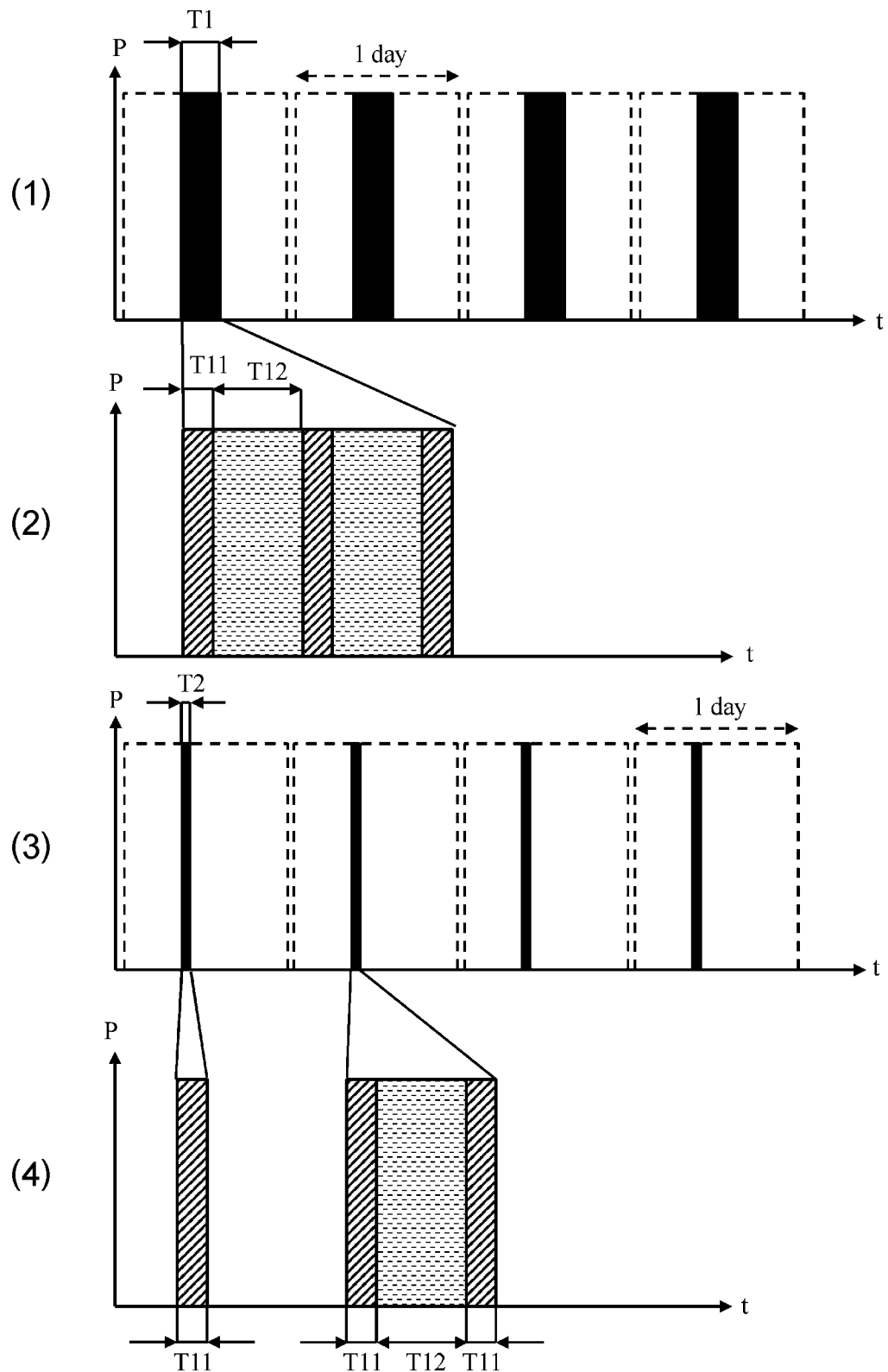
FIG. 6 is an explanatory diagram for comparing a time required for reading a meter, and in which graphs (1) and (2) represent a case of a comparative example and graphs (3) and (4) represent a case of the present example.

FIG. 6 is an explanatory diagram for comparing the time required for meter reading. The graphs of FIGS. 6(1) and 6(2) represent a case of the comparative example. The graphs of FIGS. 6(3) and 6(4) illustrate a case of the present example. A vertical axis represents power consumption, and a horizontal axis represents time.

As illustrated in FIGS. 6(1) and 6(3), the automatic inspection system mentioned herein collects the measurement data once a day. A collection interval of the measurement data is not limited to one day.

FIG. 6(2) illustrates a measurement time T1 of FIG. 6(1) in an enlarged manner. The time T1 required to perform the measurement of the inspection target 3 once can be divided into a capturing time T11 and an exposure adjustment time T12. When the capturing using a first selected exposure parameter fails, the exposure parameter is adjusted. The capturing is performed again after the exposure parameter is adjusted. When the capturing still fails even though the exposure parameter is adjusted, the exposure parameter is adjusted again.

In the comparative example illustrated in FIGS. 6(1) and 6(2), the exposure adjustment is performed two times, and the capturing is performed three times at the time of performing the measurement once. That is, the acquisition of the image is retried multiple times. It is assumed that the time T1 required to perform the measurement once is, for example, 7 seconds. Most of the time T1 required to perform the measurement is occupied by an exposure adjustment time T12. Therefore, the amount of power consumed by the reading device 1 in performing the measurement once strongly depends on the number of times of the exposure adjustment.

In contrast, in the present embodiment, as illustrated in FIG. 6(3), a time T2 required to perform the measurement once is shorter than the measurement time T1 in the comparative example. In the present embodiment, the exposure parameter management unit 13 determines the exposure parameter by using the exposure adjustment information received from the data collection device 2, sets the determined exposure parameter for the measurement unit 11, and then activates the measurement unit 11. Accordingly, in the present embodiment, the exposure adjustment when the measurement unit 11 is activated can be omitted. Since the exposure parameter set when the measurement unit 11 is activated is an exposure parameter with which the previous measurement succeeds, there is a high possibility that the first capturing will succeed. Therefore, in the present embodiment, there is a high possibility that an appropriate exposure parameter will be used, and the number of times the measurement is retried can be reduced. As a result, the power consumption of the reading device 1 can be reduced, and an operation for a long period of time can be realized.

As illustrated on a right side of FIG. 6(4), the measurement may not succeed with the exposure parameter set at the time of activation due to changes in sunlight. In this case, the re-measurement is performed after the exposure parameter is adjusted. When the re-measurement succeeds, the exposure parameter when the measurement succeeds is stored in the exposure parameter table 131.

According to the automatic inspection system of the present embodiment, as the operation is continued, since an exposure parameter suitable for the measurement environment (degree of brightness) is learned and accumulated, the power consumption of the reading device 1 can be suppressed, and the frequency of replacement of the built-in battery 14 can be increased.

When the measurement succeeds with the exposure parameter set at the time of activation, the measurement time T2 can be significantly shortened compared to the comparative example. Even though the measurement fails with the exposure parameter set at the time of activation, the average number of times of the exposure adjustment is considered to be smaller than in the comparative example. This is because the exposure parameter set at the time of activation is a value with which the previous measurement succeeds.

Although it has been described in the present embodiment that the exposure parameter management units 13 are provided in all the reading devices 1 participating in the wireless network, the present invention is not limited thereto, and the exposure parameters may be managed only for some of the reading devices 1. This configuration is also included in the scope of the present invention. For example, the exposure parameter may be managed only for the reading device 1 installed in a location that is easily affected by weather and lighting conditions.

Second Embodiment

A second embodiment will be described with reference to FIGS. 7 to 9. In the present embodiment, differences from the first embodiment will be mainly described. In the present embodiment, a case in which the exposure parameter appropriate for each road condition information and for each reading device 1 is collected and is used for another automatic inspection system will be described. Alternatively, the present embodiment can be applied to a case where the power consumption of another reading device 1 is suppressed by copying the exposure parameter accumulated in a certain reading device 1 to the other reading device 1 in the same automatic inspection system.

Figure 7:
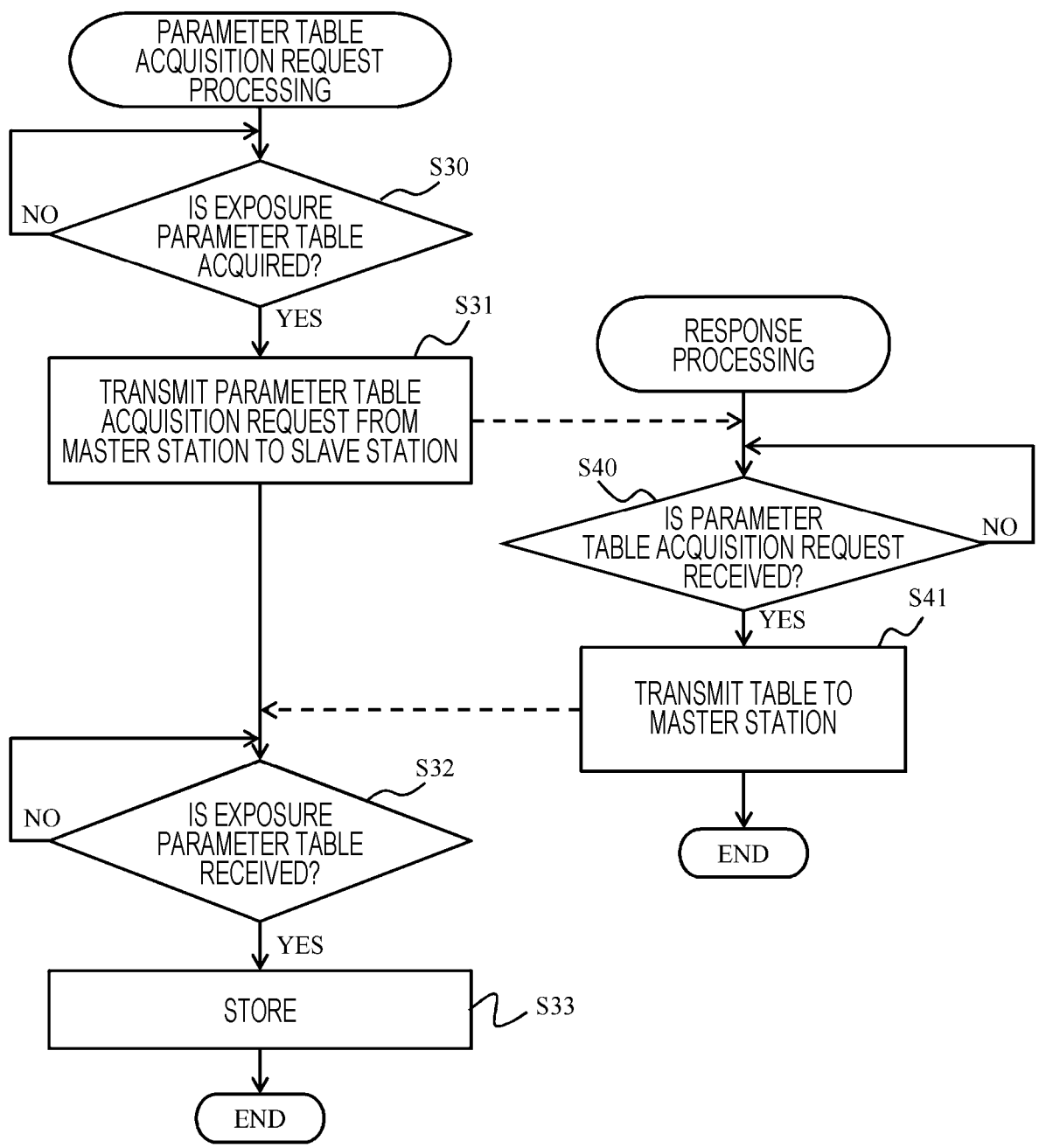
FIG. 7 is a flowchart illustrating processing for collecting an exposure parameter from each reading device according to a second embodiment.

FIG. 7 is a flowchart illustrating processing for acquiring the exposure parameter table 131 from the reading device 1 by the data collection device 2.

The inspection recording unit 21 of the data collection device 2 determines whether it is time to acquire the exposure parameter table 131 (S30). For example, the data collection device 2 can acquire the exposure parameter table 131 from all or a part of the reading devices 1 according to a preset schedule. Alternatively, the data collection device 2 can acquire the exposure parameter table 131 according to an instruction input from the external device 6.

When the exposure parameter table 131 is acquired (S30: YES), the inspection recording unit 21 requests the reading device 1 as an acquisition target to transmit the exposure parameter table 131 from the wireless master station 20 via the wireless slave station 10 (S31).

When the request from the data collection device 2 is received (S40: YES), the exposure parameter management unit 13 of the reading device 1 transmits the exposure parameter table 131 to the data collection device 2 via the wireless network (S41).

When the exposure parameter table 131 is received from the reading device 1 (S32: YES), the inspection recording unit 21 of the data collection device 2 stores this table in the measurement data storage unit 24 (S33). A storage destination of the exposure parameter table 131 is not limited to the measurement data storage unit 24, and may be another storage unit.

Figure 8:
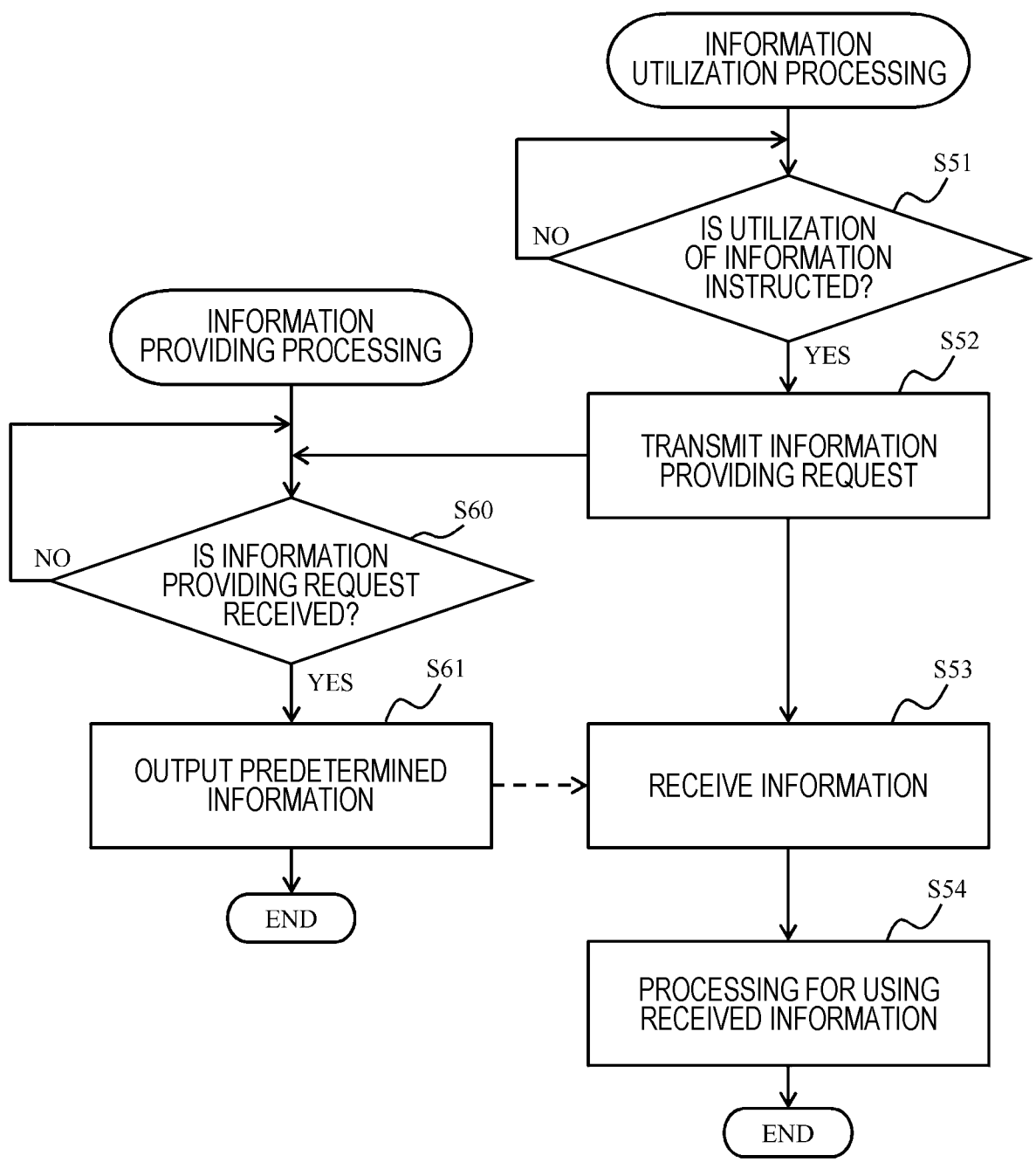
FIG. 8 is a flowchart illustrating processing for providing the exposure parameter collected from each reading device to an external device.

FIG. 8 is a flowchart illustrating processing for providing the exposure parameter table 131 and the like of the reading device 1 to the external device 6.

The user logs in to the information providing unit 26 via the external device 6 and displays a menu screen provided by the information providing unit 26 on a display device (not illustrated) of the external device 6. The user uses the information provided by the data collection device 2 by operating the menu screen. When the user instructs the utilization of information (S51: YES), an information providing request is transmitted from the external device 6 to the information providing unit 26 of the data collection device 2.

When the request from the external device 6 is received (S60: YES), the information providing unit 26 generates predetermined information 260 (described below in FIG. 9) including the contents of the exposure parameter table 131, and transmits the generated predetermined information 260 to the external device 6 (S61).

The external device 6 receives the predetermined information 260 from the information providing unit 26 (S53), and uses the predetermined information 260 (S54).

Figure 9:
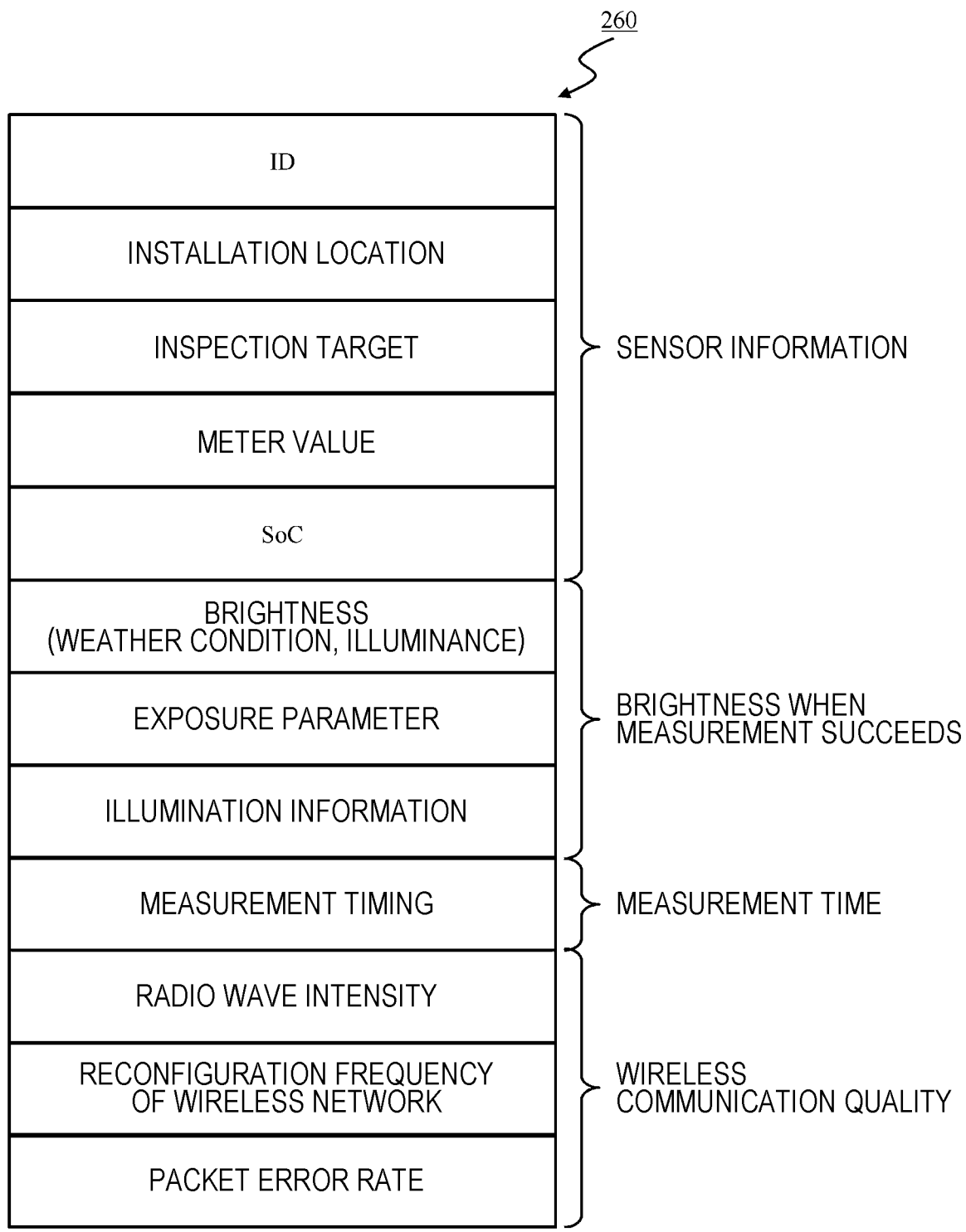
FIG. 9 is an explanatory diagram illustrating an example of information provided to an external device.

FIG. 9 illustrates an example of the predetermined information 260 provided to the external device 6 by the information providing unit 26. The predetermined information 260 can include, for example, all or a part of sensor information, information related to brightness when the measurement succeeds, information the measurement time, and information of wireless communication quality. The predetermined information 260 may include new information not illustrated in FIG. 9.

The sensor information includes, for example, identification information (ID) for identifying the reading device 1, the installation location of the reading device 1, the type and model of the inspection target 3, the read meter value, the state of charge (SoC) of the built-in battery 14 of the reading device 1.

The information related to brightness when the measurement succeeds includes, for example, the contents (indicated as "brightness (weather condition and illuminance)" and "exposure parameter" in FIG. 9) of the exposure parameter table 131 for each exposure adjustment information and illumination Information.

The information related to the measurement time includes, for example, information indicating a timing when the inspection target 3 is measured by the measurement unit 11.

The information of the wireless communication quality includes, for example, radio wave intensity, the frequency of reconfiguration of the wireless network, and a packet error rate.

The user can grasp whether the environment of each reading device 1 is the measurement environment or the wireless communication environment, a timing when the inspection target 3 is measured, and information related to the state of charge of the reading device 1 by analyzing the predetermined information 260.

Therefore, the user can adjust the exposure parameter table 131 of each reading device 1 included in the automatic inspection system to be newly installed based on the predetermined information 260, and can set the adjusted exposure parameter table 131 for the exposure parameter management unit 13 of the reading device 1 in advance. Thus, it is possible to reduce a trial and error of the exposure adjustment in the automatic inspection system scheduled to be newly set. Therefore, according to the present embodiment, a learning period of time for which the exposure parameter table 131 is set to an appropriate value can be shortened, and the usability is improved compared to a case where the value of the exposure parameter table 131 is not set.

The same effect can also be obtained when a new reading device 1 is added to an existing automatic inspection system or an old reading device 1 is replaced with a new reading device 1. That is, the user can prepare an appropriate exposure parameter table 131 for the new reading device 1 while referring to the predetermined information 260, and can store the appropriate exposure parameter table in the exposure parameter management unit 13 of the new reading device 1.

The present invention is not limited to the aforementioned embodiments. A person skilled in the art can make various additions and changes to the aforementioned embodiments within the scope of the present invention. In the aforementioned embodiments, the present invention is not limited to the configuration examples illustrated in the accompanying drawings. The configurations and processing methods of the embodiments can be changed appropriately within the scope of achieving the object of the present invention.

The components of the present invention can be arbitrarily selected, and an invention having a selected configuration is also included in the present invention. The configurations described in the claims can be combined into combinations other than those specified in the claims.

REFERENCE SIGNS LIST 1 reading device
2 data collection device
3 inspection target
4 information distribution device
5 illuminance meter
6 external device
10 wireless slave station
11 measurement unit
12 sensor information analysis unit
13 exposure parameter management unit
14 built-in battery
20 wireless master station
21 inspection recording unit
22 illuminance-related data acquisition unit
23 exposure adjustment information generation unit
24 measurement data storage unit
25 inspection management information storage unit
26 information providing unit
100 measurement data acquisition request
110 measurement data

The invention claimed is:

1. An automatic inspection system comprising:
a measurement device which outputs measurement data; and
a data collection device which collects the measurement data outputted from the measurement device,
wherein the data collection device comprises:
a processor configured to:
generate exposure parameter determination information; and
request the measurement device to acquire the measurement data and include the exposure parameter determination information for the measurement device in the request, receive the measurement data acquired by the measurement device and store the measurement data received from the measurement device, and
wherein the measurement device includes a sensor configured to capture an image of an inspection target; and
a processor configured to:
manage a predetermined exposure parameter used when the sensor captures the image of the inspection target, and determine the predetermined exposure parameter set for the sensor unit based on the exposure parameter determination information received from the data collection device; and
generate the measurement data by analyzing data obtained from the captured image.

2. The automatic inspection system according to claim 1, wherein
the measurement device is provided in plural,
the plurality of measurement devices is connected to wireless slave stations communicating via a wireless network,
the data collection device is connected to a wireless master station communicating with each wireless slave station connected to each measurement device via the wireless network,
each measurement device is operated by using a power of a built-in power supply, and
the sensor is a camera, and the predetermined exposure parameter is an exposure time.

3. The automatic inspection system according to claim 2, wherein
when data analysis of the generated measurement data fails, the processor, of the measurement device, is further configured to adjust the predetermined exposure parameter set for the sensor, and
when the data analysis of the generated measurement data succeeds when the adjusted predetermined exposure parameter is used, the processor of the measurement device is further configured to store the adjusted predetermined exposure parameter in association with the exposure parameter determination information.

4. The automatic inspection system according to claim 3, wherein when the predetermined exposure parameter corresponding to the exposure parameter determination information received from the data collection device is not stored, the processor, of the measurement device, is further configured to set an initial exposure parameter stored in advance for the sensor.

5. The automatic inspection system according to claim 4, wherein the processor, of the data collection device, is further configured to collect the predetermined exposure parameter stored in association with the exposure parameter determination information from each measurement device, and provide the collected predetermined exposure parameters to an external device.

6. The automatic inspection system according to claim 5, wherein the processor, of the data collection device, is further configured to generate the exposure parameter determination information based on at least one information of information acquired from an information distribution device connected via a communication network and information which is included in each measurement device and is acquired from a predetermined measurement device.

7. An automatic inspection method of collecting measurement data in a computer from a measurement device, the method comprising:
generating, by the computer, exposure parameter determination information for determining a predetermined exposure parameter used when the measurement device captures an image of an inspection target;
requesting, by the computer, the measurement device to acquire the measurement data and including the exposure parameter determination information for the measurement device in the request;
determining, by the measurement device, the predetermined exposure parameter corresponding to the exposure parameter determination information from stored predetermined exposure parameters when the acquisition of the measurement data is requested from the computer;
capturing, by the measurement device, the image of the inspection target by using the determined predetermined exposure parameter, generating the measurement data by analyzing data obtained from the captured image and transmitting the measurement data to the computer;
storing, by the computer, the measurement data acquired from the measurement device;
adjusting, by the measurement device, the predetermined exposure parameter and again capturing the image of the inspection target when data analysis of the generated measurement data fails; and
storing, by the measurement device, the predetermined exposure parameter in association with the exposure parameter determination information when the data analysis of the generated measurement data succeeds.

* * * * *